United States Patent [19]

Smith, Jr.

[11] 4,090,118
[45] May 16, 1978

[54] WORKPIECE SHEAR CONTROL

[75] Inventor: Andrew W. Smith, Jr., Mt. Lebanon, Pa.

[73] Assignee: Westinghouse Electric Corp., Pittsburgh, Pa.

[21] Appl. No.: 670,584

[22] Filed: Mar. 25, 1976

[51] Int. Cl.² .............................................. H02P 1/04
[52] U.S. Cl. .................................... 318/392; 318/396
[58] Field of Search ................. 318/39, 264, 276, 277, 318/384, 385, 392, 393, 396, 397, 445, 446, 466

[56] References Cited

U.S. PATENT DOCUMENTS

| | | | |
|---|---|---|---|
| 2,692,361 | 10/1954 | Asbury et al. | 318/392 X |
| 3,189,812 | 6/1965 | Davis | 318/445 |
| 3,614,572 | 10/1971 | Usher | 318/396 |

Primary Examiner—Robert K. Schaefer
Assistant Examiner—W. E. Duncanson, Jr.
Attorney, Agent, or Firm—R. G. Brodahl

[57] ABSTRACT

A rolling mill workpiece shear control apparatus and method are disclosed to provide adequate acceleration torque at the desired time of workpiece product cut. For particularly low product speed cut operations, a two step acceleration is provided that brings the shear to an initial low base speed of operation and at the desired time an acceleration to operating knife speed in accordance with the measured product speed. In relation to the desired product length, the time of the actual product cut is determined and updated for future similar cuts of product length and speed.

24 Claims, 15 Drawing Figures

WORKPIECE SHEAR CONTROL

BACKGROUND OF THE INVENTION

It is known in the prior art to control the operation of a workpiece shear in association with a hot strip rolling mill in accordance with the measured speed of the last roll stand as an indication of product travel distance and in accordance with the sensed head end of the work product by a hot metal detector. A speed reference signal is provided to the shear motor for controlling the rotation speed of the shear knife blade. It is known to provide a vernier adjustment to the determination of a present cut, when a similar previous cut was one of too early or too late, for moving in time the start of the speed reference ramp signal. If adequate motor current was not available for a previous similar length and speed cut of the work product, the home position of the knife blade was adjusted to result in a shorter travel distance with a more rapid acceleration. However, since the speed of the associated rolling mill can change between successive work products, the repositioning of the home or rest location of the knife blade is not a satisfactory solution to the problem of providing an adequate acceleration current energization of the shear drive motor to effect the desired cut of the work product. During a slow speed cut, a different home or rest position has been provided as required to result in a shorter travel distance and more motor current available to make the work product cut.

The conventional way of controlling a flying shear is to use a linear ramp speed reference signal from motor standstill to product cut. Since the acceleration rate is a function of the product velocity squared, this provides for a low speed product cut a motor acceleration rate which is too low for desired product cut operation of the shear.

It is known in the prior art as disclosed by U.S. Pat. No. 3,189,812 of M. A. Davis et al and U.S. Pat. No. 3,082,368 of W. D. Rowe to measure the velocity of a workpiece moving in relation to a shear and determine the necessary time delay before the shear is operated to cut a preset length from the head end of a workpiece and if desired to cut a preset length from the tail end of the workpiece. A reversible first counter is started to count in a first direction in response to signal pulses at a known frequency when the workpiece is detected by a first detector. When the workpiece reaches a second detector spaced a known distance from the first detector, the stored count of the reversible counter is transferred to a multiplier counter and the reversible counter begins to count in the opposite direction at a fractional frequency determined by the distance between the two detectors in relation to the distance between the second detector and the shear. At a predetermined count level of the first counter, the second multiplier counter responds to the signal pulses for controlling the shear.

SUMMARY OF THE INVENTION

A workpiece shear control apparatus and method are provided for determining the movement speed of the workpiece and then predictively determining an operational parameter of the shear device, such as the acceleration rate, at the time of workpiece cut in relation to that movement speed of the workpiece. A speed control reference characteristic for the shear motor is selected in accordance with that parameter to accelerate the shear knife blade as desired and to cut the work product at a speed such that the knife blade speed is substantially the same as the workpiece speed passing the shear. Included is the selection of one of a single step speed control ramp characteristic or a two step speed control ramp characteristic as required for sufficient drive motor current at particularly low work product speed cuts. An adaptive learning procedure is included to correct a detected too slow cut or a detected too fast cut in relation to product speed at the time of cut, such that the speed control ramp provides the proper speed of the knife blade as well as the proper time of the cut for accuracy and smoothness of the resulting work product cut. Any difference between the theoretical time required for a desired cut and the sensed actual time can be detected and utilized to correct the next similar cut, through classified corrections that are stored in relation to the shear speed and the timing of the work product cuts. For every cut the knife blade travels the same distance from the same rest or home position for all rolling mill operating speeds.

DESCRIPTION OF A PREFERRED EMBODIMENT

Figure 1:
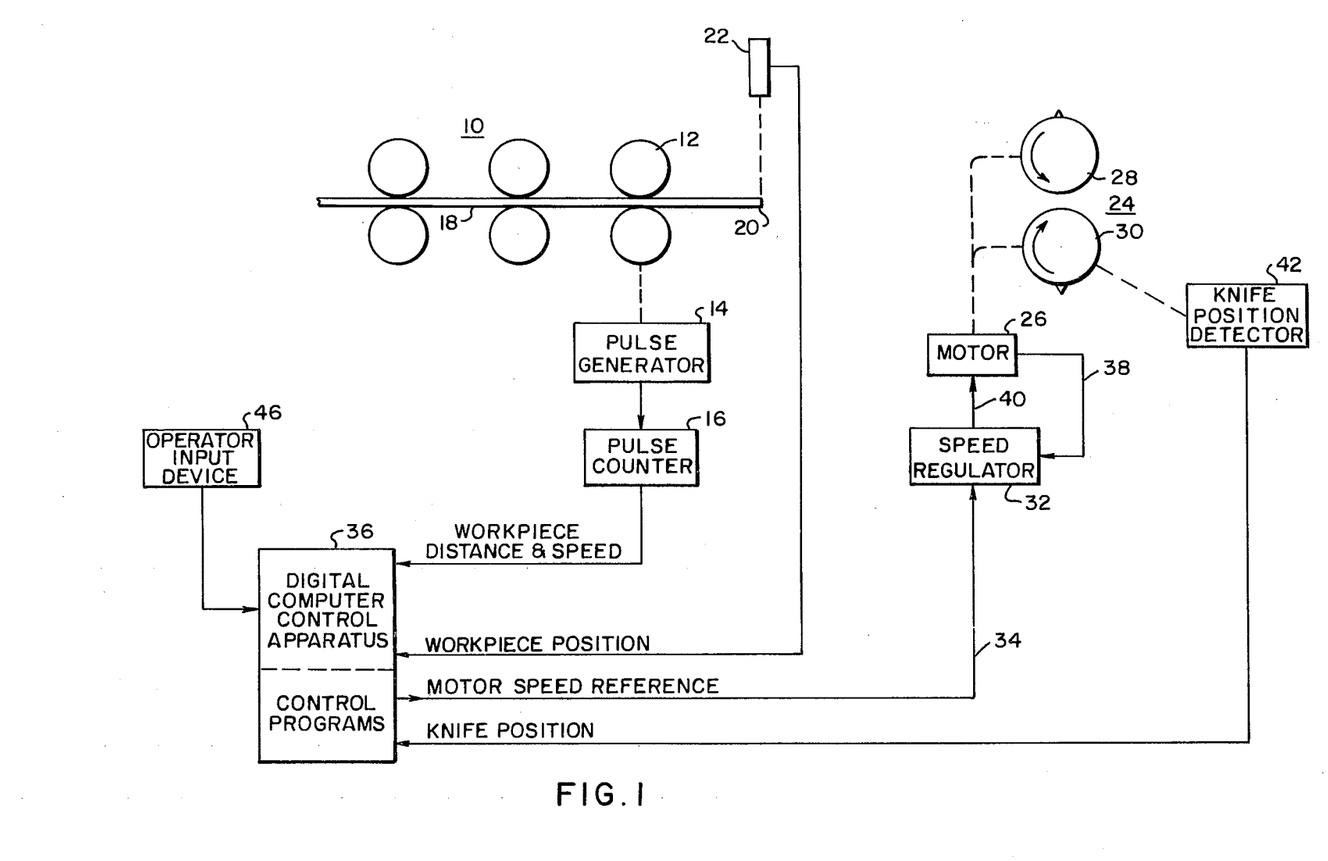
In FIG. 1 there is diagrammatically shown the control arrangement of the present invention.

In FIG. 1 there is shown a hot rolling mill 10, including a last roll stand 12 operative with a pulse generator 14 to provide output pulse signals in accordance with the rotational speed of the roll stand 12 to a pulse counter 16. A workpiece 18 passes through the rolling mill 10, and after leaving the last roll stand 12 the head end 20 is detected by a hot metal detector 22. A workpiece shear device 24 is located a predetermined distance, such as 30 feet, after the hot metal detector 22. A drive motor 26 is operative with the shear device 24 to provide a desired cut of the workpiece 18 by controlling the rotation of the shear knife members 28 and 30. A speed regulator 32 receives a speed reference signal on line 34 from the digital computer control apparatus 36, and compares this speed reference signal with a feedback actual speed signal on line 38 from the motor 26 for providing a speed correction error signal on line 40 to the motor 26. A knife position detector 42 is operative to sense the position of the knife members 28 and 30 and provide a knife position feedback signal to the control apparatus 36. The digital computer control apparatus 36 receives workpiece distance and workpiece speed signals from the pulse counter 16, receives a workpiece position signal when the head end of the workpiece 18 reaches the first hot metal detector 22. The digital computer control apparatus 36 outputs the motor speed reference signal on line 34 to the speed regulator 32. A manual input device 46 is provided for the operator to input the total length of the particular workpiece 18 to be cut by the shear 24, and the respective lengths of the succeeding desired workpiece cuts to be made by the shear 24. If the workpiece 18 is one of more hot or more cold than a normal temperature, the operator input information could reflect this actual workpiece temperature condition. The digital computer control apparatus 36 is programmed to generate the analog speed reference output signal on line 34 to the speed regulator 32.

The product movement as to distance and speed is determined by the pulse generator 14 driven by the last operating stand 12 and a pulse counter 16, in conjunction with the digital computer control apparatus 36 reading the pulse count every 1/10 second and converting this information into work movement speed and distance as well known to persons skilled in this particular art. The head end of the workpiece 18 is detected as it leaves the last stand 12 and the time for a head crop and the time for each of the length cuts are then determined by the digital computer control apparatus 36. The speed reference on line 34 is sent to the motor speed regulator 32 in a way to cause each cut to occur at the desired time and to cause the shear blades to travel at the speed corresponding to the workpiece product speed at the time of cut. The position of the shear is monitored throughout each cut cycle to determine the actual time and the actual speed of the workpiece cut. This information is used to improve the operation of the shear 24 on later similar cuts. The digital computer control apparatus 36 positions the shear 24 to the home position after each workpiece cut.

In general, a typical shear device such as here illustrated can have a 300 HP drive motor having a rated speed of 1160 RPM, with a rated motor torque of 2715 lb.ft., a blade radius of 12.082 inches and a blade travel of 75.8 inches per revolution. The blade is geared to make six revolutions for a total travel from cut to cut of 454.8 inches, such that the travel from home position to cut is half the total or 227.4 inches. The ratio of knife speed to motor speed is 1.607, and the total inertia referred to the motor is 800 lb.ft.$^2$. The acceleration rate of the motor at rated torque is 1045 RPM per second and for the shear blade is 4080 FPM per second or 816 inches per sec.$^2$. The blade speed is 4530 FPM at a motor speed of 1160 RPM. The shear device general acceleration, velocity and distance operational equations are as follows. Assuming the change from zero speed to an acceleration rate A is an exponential relationship with a system time constant TC, then the acceleration as a function of time T would be $$AFT = A * (1 - e^{-T/TC}) \qquad (1)$$

$$AFT = A - A * e^{-T/TC} \qquad (2)$$

The velocity V would be $$V = \int AFT\, dt \qquad (3)$$

$$V = A * T + A * TC * e^{-T/TC} + C_1 \qquad (4)$$

At an initial time $T = 0$ and a velocity $V = 0$, the constant of integration $C_1 = -A * TC$ $$V = A * (T + TC * e^{-T/TC} - TC) \qquad (5)$$

The distance S would be $$S = \int V\, dt \qquad (6)$$

$$S = A * (T^2/2 - TC^2 * e^{-T/TC} - TC * T + C_2) \qquad (7)$$

At an initial time $T = 0$ and the distance $S = 0$, the constant of integration $C_2 = A * TC^2$.

$$S = A * (T^2/2 - TC^2 * e^{-T/TC} - TC * T + TC^2) \qquad (8)$$

If the time $T = N * TC$, where N is the number of time constants represented by T, $$V = A * TC * (N + e^{-N} - 1) \qquad (9)$$

$$\frac{V}{A*TC} = N + e^{-N} - 1 \qquad (10)$$

$$S = A * TC^2 * \left[ \frac{N^2}{2} - (N + e^{-N} - 1) \right] \qquad (11)$$

$$\frac{S}{A*TC^2} = \frac{N^2}{2} - (N + e^{-N} + 1) \qquad (12)$$

$$\frac{S/V}{TC} = \frac{N^2}{2*(N + e^{-N} - 1)} - 1 \qquad (13)$$

In the calculations by the digital computer, there are tables of values for $V/A*TC$ and $S/V/TC$ arranged to solve above equations 10, 12 and 13 for N. Over the range of interest for controlling the shear device, the stored values can be interpolated. The stored tables include a number of values for various values of N and $V/A*TC$, so a given value of $V/A*TC$ can be used to interpolate between two stored table values to determine N, using representative data points that have previously been solved and then interpolating therebetween.

Figure 2A:
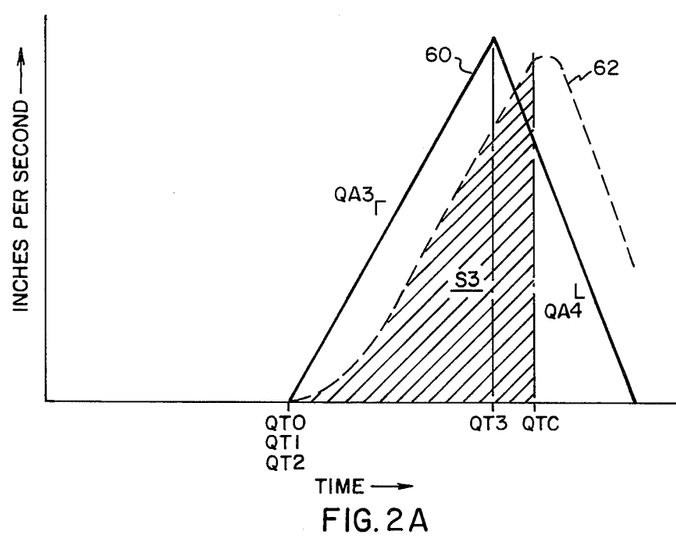
In FIGS. 2A and 2B there are provided graphic illustrations of the shear motor speed as a function of time for respectively a one step acceleration and a two step acceleration of the shear drive motor.

In FIG. 2A there is shown a graphic illustration of a one step acceleration control provided for a shear drive motor. To calculate the one step acceleration operation shown in FIG. 2A, the time QT0 for the drive motor acceleration to start in accordance with speed reference signal curve 60 is determined and the acceleration rate QA3 is determined. The time QT3 is determined when the reference speed signal begins to decrease and the deceleration rate QA4 is determined. The actual speed of the drive motor is shown by the curve 62 with the time of cut QTC being determined. The travel distance S3 of the knife blade is shown as the area beneath the curve 62 up to the time of cut QTC and calculated as the integral of the drive motor velocity.

Figure 2B:
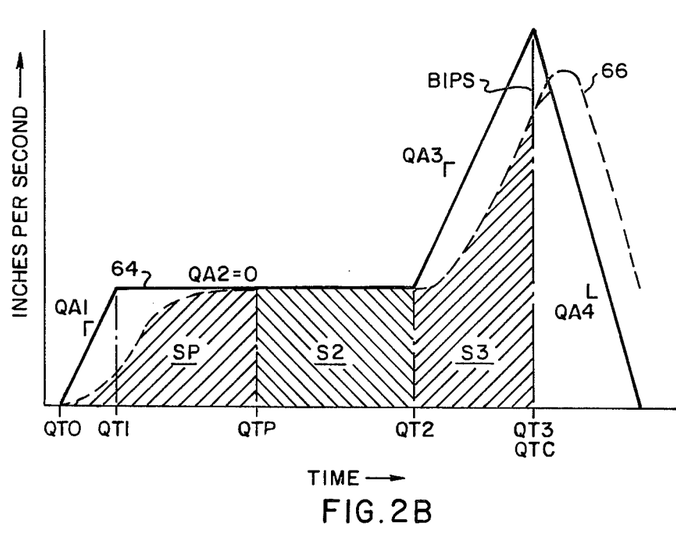

In FIG. 2B there is shown a graphic illustration of a two step acceleration control provided for the shear drive motor. The time QTO for the drive motor to start in accordance with the speed reference signal curve 64 is determined and the acceleration rate QA1 for the drive motor until time QT1 where an intermediate speed QA2 of zero acceleration is provided for a determined length of time QT2-QT1. At time QT2 a motor acceleration at rate QA3 is begun, such that an adequate acceleration rate to the time of workpiece cut QTC is provided. The area under the actual speed curve 66 between the time QT2 and the time of cut QTC is the distance that the knife blade has to travel during the acceleration from the intermediate speed QA2 to the workpiece cut, in accordance with the time constant and the acceleration rate QA3. The time QTP is a fixed time of one half second, such that the drive motor is controlled to accelerate at rate QA1 from start time QTO to time QT1 and then the knife blade travels at a fixed speed until time QTP, such that the knife blade travels a predetermined distance SP up to the time QTP. The distance S2, to be varied in accordance with the travel speed of the workpiece, is the difference between the known total travel distance SP+S2+S3 minus the distance SP up to the intermediate speed and minus the distance S3 from the intermediate speed up to workpiece cut. When the distance S2 is determined, the time QT2-QTP that the drive motor remains at the intermediate speed, is determined by dividing the time QT2-QTP by the intermediate speed.

One actual shear device to be controlled, had a knife blade travel of 454.8 inches from cut to cut, and the knife blade traveled 227.4 inches from home position to workpiece cut position, so the total area under the acceleration curve 66 as shown in FIG. 2B up to the workpiece cut at time QTC is 227.4 inches. Thusly, the sum of SP+S2+S3 is equal to 227.4 inches. The quantities SP and S3 are known, so the distance S2 can be determined from this relationship, and with the distance S2 and the intermediate speed known the time QT2-QTP can be determined. Then in practice the speed reference signal supplied to the speed regulator 32 shown in FIG. 1 will be in accordance with the speed reference curve 64 shown in FIG. 2B, with the acceleration rate QA1 being initially provided from time QTO until time QT1, and then a constant speed reference until time QT2 and then the acceleration rate QA3 until time QT3 followed by the deceleration rate QA4.

At high drive motor speeds and workpiece speeds, the deceleration QA4 is at a high rate and at lower drive motor speeds and workpiece speeds the deceleration QA4 is at a more moderate rate. One control objective is not to make a second and undersired cut in the workpiece before the knife blade stops at the home position. At particularly high workpiece speeds, if the knife blade is not returned to the home position rapidly, it might go all the way around and make an undesired cut. At very high workpiece speeds, the speed reference is brought down before the time of the workpiece cut as illustrated in 2A where the time of cut QTC is after the end of the acceleration QA3 and after the beginning of the deceleration QA4.

Figure 3A:
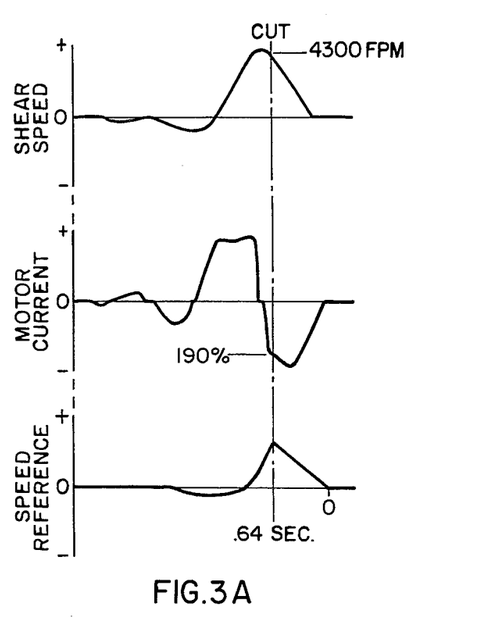
FIG. 3A, 3B, 3C and 3D there are provided oscillographic illustrations of the respective drive motor speed, the motor current and speed reference signal for each of a high speed product cut, a medium speed product cut, a low speed product cut and a very low speed product cut in accordance with the present invention.
Figure 3B:
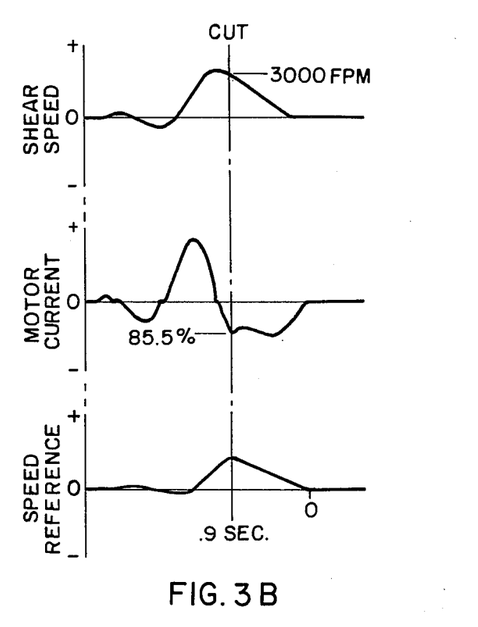
Figure 3C:
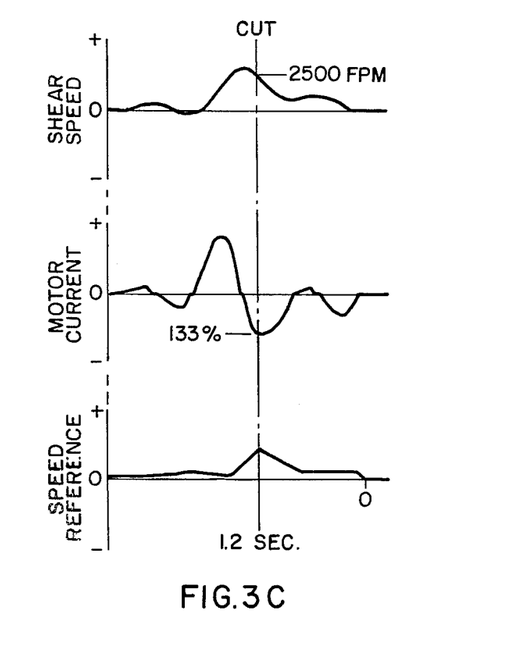
Figure 3D:
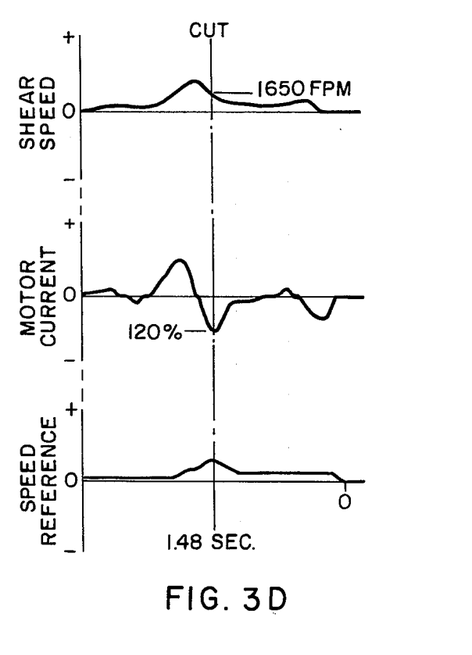

In each of FIGS. 3A to 3D there are shown respective recordings of the drive motor speed, the motor current and the speed reference signal for each of a high speed workpiece cut as shown in FIG. 3A, a medium speed workpiece cut as shown in FIG. 3B, a low speed workpiece cut as shown in FIG. 3C and a very low speed workpiece cut as shown in FIG. 3D, as taken with a shear device actually cutting workpieces. In FIG. 3A the workpiece speed is 4300 FPM, the motor current at time of cut is 190% of rated current and a one step speed reference signal is provided to the motor speed regulator operative with the drive motor. In FIG. 3B the workpiece speed is 3000 FPM, the motor current at time of cut is 85.5% of rated current and a one step spaced reference is provided to the motor speed regulator. In FIG. 3C the workpiece speed is 2500 FPM, and a two step speed reference signal is provided to the motor speed regulator such that the motor current at time of cut is 133%; a one step speed reference signal at this workpiece speed would result in a motor current below 75% of rated current and this is considered to be below the practical limit for a proper workpiece cut. In FIG. 3D the workpiece speed is 1650 FPM, and a two step speed reference signal is provided to the motor speed regulator such that the motor current at the time of cut is 120% of rated current. FIGS. 3A to 3D show oscillographic recordings for an actual dividing shear operation for respectively a high, medium, low and very low workpiece product speeds. The bottom recording shows the speed reference that is used to feed the shear motor speed regulator. The middle recording shows the resulting shear motor current. The top recording shows the actual shear speed.

The high speed (4300 FPM) cut shown in FIG. 3A illustrates the conventional way of ramping the shear speed reference linearly from standstill in a way to cause the knife speed at cut to match the product speed. The ramp takes only 0.64 seconds from start to cut. The acceleration current in the shear drive motor is 190% of rated load at the point of cut. This motor torque along with the stored energy in the shear and drive rotating parts delivers plenty of torque for cutting the workpiece product. After each cut, the shear knife is automatically positioned to the home position. For this high speed cut, the shear is shown to actually overshoot the home position so the shear must reverse to get back to the home position.

Since each cut starts from the same home position, the distance from standstill to cut in a constant. The medium speed (3000 FPM) cut shown in FIG. 3B again shows the conventional linear ramp that requires 0.9 second from start to cut. The acceleration current is only 85.5% of rated load at time of cut. Again, the shear is shown to overshoot the home position.

If this same linear speed reference characteristic were used at lower workpiece speed, adequate torque would not be available for the cut. A crude solution previously in use was to increase the speed reference suddenly before the cut time to create acceleration current but, since the conventional motor requires a minimum time for such a motor current change(0.05 seconds to change the current by 100%) the shear speed matching was disrupted.

The present invention utilizes a two step acceleration at the lower workpiece product speeds to give adequate motor acceleration current at the time of cut and with good speed control. The low speed (2500 FPM) cut shown in FIG. 3C illustrates the present invention. The shear is quickly accelerated to a low speed of about 800 FPM, and operated at that speed for a controlled period of time. The second ramp is selected in a way to give adequate current of about 133% at the time of cut and with good speed matching. The ramp from 0 to cut takes 1.2 seconds, and a small home overshoot is shown.

The very low speed cut (1650 FPM) shown in FIG. 3D operates the shear at the low speed of about 800

FPM for a period and then brings the ramp up for a cut 1.48 seconds after the start. The acceleration current is 120% of rated load at time of cut, which is well above the 85.5% current experienced with the conventional linear ramp of 3000 FPM.

Figure 4:
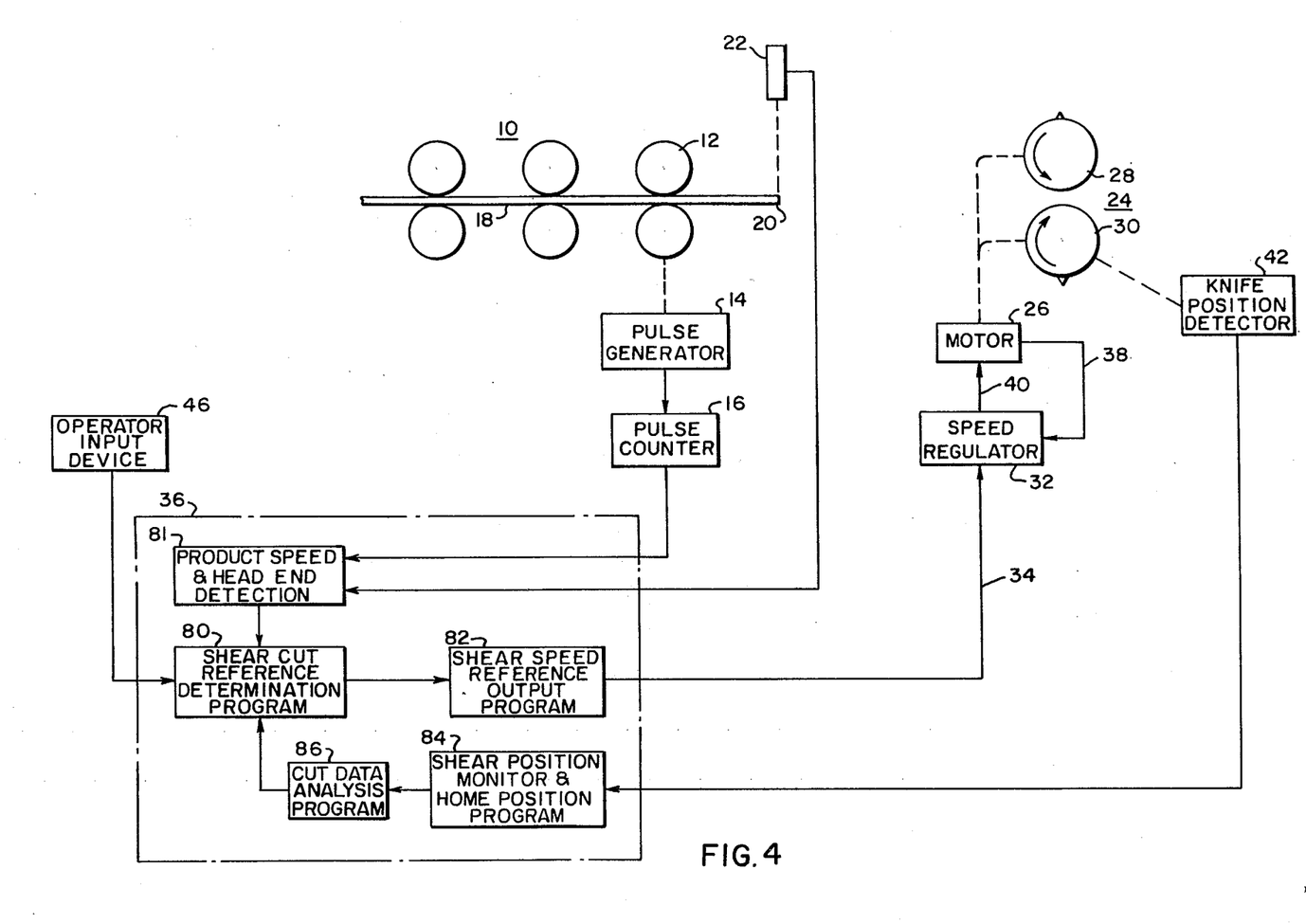
In FIG. 4 there is provided a functional illustration of the present shear drive control operation.

In FIG. 4 there is provided a functional illustration of the present shear device control operation. A first control program 80 determines what workpiece lengths are to be cut in response to operator provided input information 46 for nominal product temperatures, including the workpiece thickness, any operator desired lead speed adjustment and the desired workpiece lengths to be cut. The pulse generator 14 and the counter 16 along with the product detector 22 provide the information to a control program 81 that determines the product speed and detects the head end. A second control program 82 receives from the program 80 the determined time of cut, the determined shear speed, the calculation of a one step acceleration cut or the calculation of a two step acceleration cut. The program 82 provides as an output the motor speed reference signal to the speed regulator 32, such that the shear device 24 will accelerate properly to cut the workpiece as desired at a knife blade speed matching the workpiece speed and at the desired time. A third control program 84 monitors the position of the shear knife blade, and measures the speed of the knife blade at the time of cut to determine if the knife blade speed properly matched the workpiece speed. In addition the program 84 controls the home positioning of the shear blade after a workpiece cut. A fourth control program 86 analyzes the workpiece cut data for any error between the knife blade speed and the workpiece speed at time of cut, which error can be corrected by changing the start of the speed reference ramp for a cut of the next similar workpiece. An adaptive learning procedure is utilized to correct a detected too slow cut or a detected too fast cut, by changing the speed and time of the reference ramp for better accuracy of cutting and a more smooth cut. Each shear device is somewhat different that other shears, so this learning procedure enables a better control of a given shear device. Since the ability to predict and the repeatability of the prediction is subject to some error, and the ability to know time constants and the actual response of the shear device is somewhat limited, any difference between the theoretical time for making the cut and the measured actual time of the workpiece cut can be determined and corrected in relation to the next similar workpiece cut. Classified information tables of corrections of speed and time are stored for predetermined bands of speed to obtain accurate workpiece cuts.

The product speed and head end detection 81 operates, as well known to persons skilled in this art, to read the pulse count of the pulse counter 16 every 1/10 second and convert this reading into workpiece speed in relation to the known workpiece movement per output pulse from the pulse generator 14, and the workpiece head end detection is provided in response to the output signal from the hot metal detector 22. The shear cut reference determination program 80 determines the times and rates for the shear speed reference signal supplied on line 34 to the speed regulator 32. The shear speed reference output program 82 uses the countdown of 1KC interrupts to determine the start of the cut reference and, once it starts, it generates new reference values every 5 milliseconds. The reference output program 82 also controls the bidding of the shear position monitor program 84. The shear position monitor program 84 collects position and time data during the acceleration of the shear to cut and tracks the deceleration of the shear in a way to take over the slowdown at the proper time for accurate stopping at the home position. The cut analysis program 86 is bid after the workpiece cut is made.

As the shear device 24 is accelerated from standstill, the position changes at a slow rate so the program 84 is bid infrequently but as the shear speed increases and the program 84 is bid more frequently. It is desired to detect and store data at about 100 increment steps from standstill to cut so that the difference in shear position can be divided by the elapsed time to determine speed. At the highest speed cuts, the time to travel the first 100 increments is about 0.250 seconds and the time to travel the last 100 increments near cut position is only about 0.013 seconds.

The knife position detector 42 can update the position reading in the order of 220 times per second. In order that the elapsed time between positions be accurately known, the update signals from the detector 42 are fed into a counter and a present count comparator is used to bid the position monitoring program 84 at predetermined update counts. The number of detector 42 updates before the next check of position is done in a way to give several readings between one of the stored positions and the next when making a high speed cut. The program 84 sets the comparator to 5 updates before each reading during the search for the index position of 148 and this number is reduced to 1 for the index position 348 to 2048 (cut).

Once the cut is performed, the program 84 is bid every 2 updates (approx. 8.9 ms) to perform the slowdown for home positioning.

Figure 5:
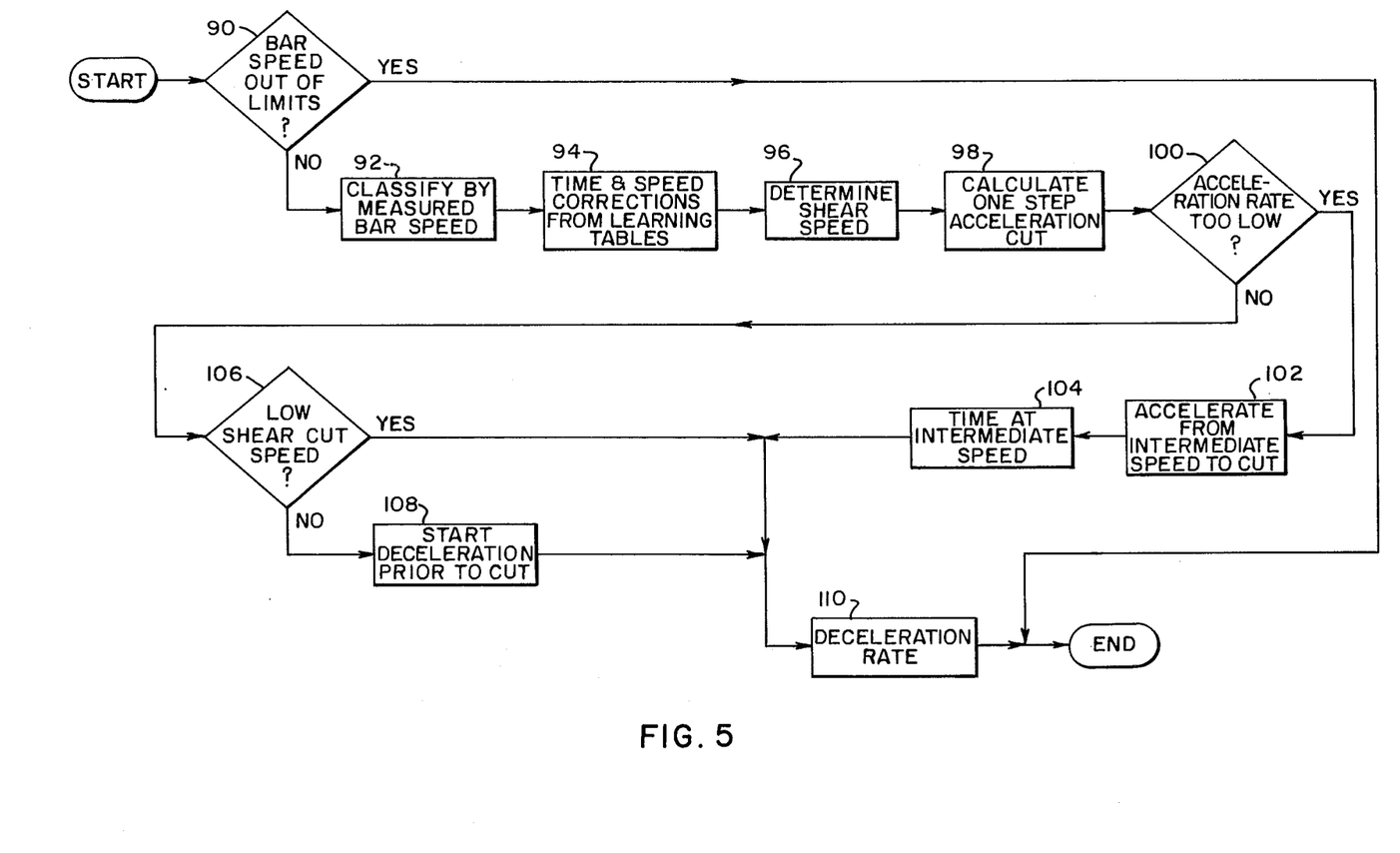
In FIG. 5 there is provided a program flow chart to illustrate the determination of the motor speed reference signal.

In FIG. 5 there is provided a flow chart to illustrate the shear cut reference determination program 80 shown in FIG. 4. This program defines all the parameters for the dividing shear speed reference output program 82 to generate the analog speed reference output signal for the speed regulator 32. The operational conditions to be achieved by the program 80 are as follows:
(a) The shear blade must start from a home position and accelerate in a way to cause the blades to meet the workpiece bar at a predetermined time for an accurate workpiece cut length.
(b) The shear blade peripheral speed at the time of workpiece cut is equal to the workpiece bar speed ± the operator's shear speed vernier.
(c) The acceleration current at the time of cut is not less than a minimum value such as 75% of rated motor current to have adequate motor torque for the cut.

A one step acceleration can be used for the higher workpiece speeds since the acceleration rate QA3 as shown in FIG. 2A is sufficient to perform the desired workpiece cut. At the lower speeds, the one step acceleration gives an inadequate accelerating motor current so as two step acceleration is used, with the shear being accelerated to an intermediate speed using a fixed rate QA1 and time QT1. The shear is then operated at the intermediate speed level until the final acceleration is initiated at time QT2 and at the rate QA3 as shown in FIG. 2B in a way to perform the cut at the desired time QTC and speed with adequate acceleration motor current.

The reference signal as shown by curve 64 is normally reduced in preparation for the stopping as soon as the cut is made but the reduction of the reference is initiated slightly before the cut at the higher speeds where excessive overshooting during the home positioning would otherwise possible occur.

As the speed reference signal approaches zero for the deceleration of the shear, the shear positioning program 84 takes over the control of the shear speed reference output program 82 for positioning the shear blade at the home position.

The program 80 operates just prior to the need for a cut (about 1 sec. prior to the cut at 4000 FPM and 3 sec. at 1000 FPM). The following data is required:
QBSPD Workpiece Bar Speed
QLASDJ Operator Provided Shear Lead Speed Vernier
QPTH Product Thickness
ACCT Cut Time (Expressed as 1KC clock time)
The results of the program are as follows:
QT0 Clock time for start of first acceleration step
QA1 Acceleration rate for first step
QT1 Clock time for the end of first acceleration step
QA2 Acceleration rate for intermediate period (O)
QT2 Clock time for the start of second acceleration step
QA3 Acceleration rate for the second acceleration step
QT3 Clock time for the beginning of the deceleration
QA4 Deceleration rate
QBIPS Shear Blade Speed at time of cut At step 90 shown in FIG. 5 a check is made to see if the workpiece speed as measured by the pulse generator 14 and pulse counter 16 is out of predetermined limits for the shear control to function, and if so the program ends and no cut is made. If no, at step 92 the workpiece is classified into one of several predetermined ranges of workpiece speeds, such as according to ten equal percentage speed ranges from the minimum mill speed of 1000 FPM to the maximum of 4400 FPM. At step 94, according to the speed classification, a time correction and a speed correction is selected from a stored learning table. Each time a cut is made, the actual cut time and the predicted cut time are compared to update the time correction, and the actual blade speed and the predicted blade speed are compared to update the speed correction. At step 96, the operator provided shear lead speed vernier, having a value between −5 to +10%, and the learning table speed correction are used to determine the shear knife speed. The knife speed is also adjusted to give the desired horizontal knife speed just as the blade touches the product. At step 98, the time from the initiation at QT2 of the acceleration ramp up to the time QTC of the cut is determined, to give the desired knife velocity and travel using above equation (13), then knowing the velocity and the time, equation (10) is used to determine the acceleration rate AQ3. At step 100, the acceleration rate AQ3 is compared to the minimum acceleration rate of 75% that is required to provide minimum motor torque at the time of cut, and if the rate QA3 is less than 75%, the program goes to step 102 and a two step acceleration is used. At step 102, the time difference QT3-QT2 and the distance S3 required for accelerating at an adequate rate from the intermediate speed to the cut are determined using above equation (10). At step 104 the time at intermediate speed is determined. Since the first step of the two step acceleration as shown in FIG. 2B is always the same, the distance SP traveled after a predetermined time QTP long enough for the shear to reach intermediate speed is known. This distance SP along with the distance S3 determined from the second step are used to calculate the period of time QT2-QTP the shear should run at the intermediate speed before the second acceleration step. When the acceleration rate QA3 is greater than 75%, a check is made at step 106 to see if the shear speed is below 3800 FPM. If the shear speed is greater than 3800 FPM, at step 108 when the shear speed is very high, the deceleration of the shear is initiated slightly prior to the time of cut (as much as 0.050 sec.) to avoid excessive overshooting in the home positioning.

At step 110, the deceleration rate is chosen at a high rate such as 275% when the cut speed is greater than 3800 FPM and a lower rate such as 185% for lower cut speeds. The shear positioning program takes over the control of the speed reference for controlling the return to home after cut in a way to give fast and accurate home positioning. In deciding when to use the two step acceleration operation rather than one step, a test of expected acceleration rate at time of cut step 100 will result in some cuts on a given piece being performed with a single ramp and other cuts, when the bar speed has dropped slightly or the operator vernier adjustment is changed, being performed with two step acceleration. If it is desired that, for more consistent results, that all of the cuts in a given bar use the same control operation, from experience it can be decided that the product speed as the head end of the bar is delivered from the mill be used to decide the type of control operation throughout all the cuts on a given bar. For example, if the product speed is less than 2800 FPM, two step acceleration would be used for all such cuts.

Figure 6:
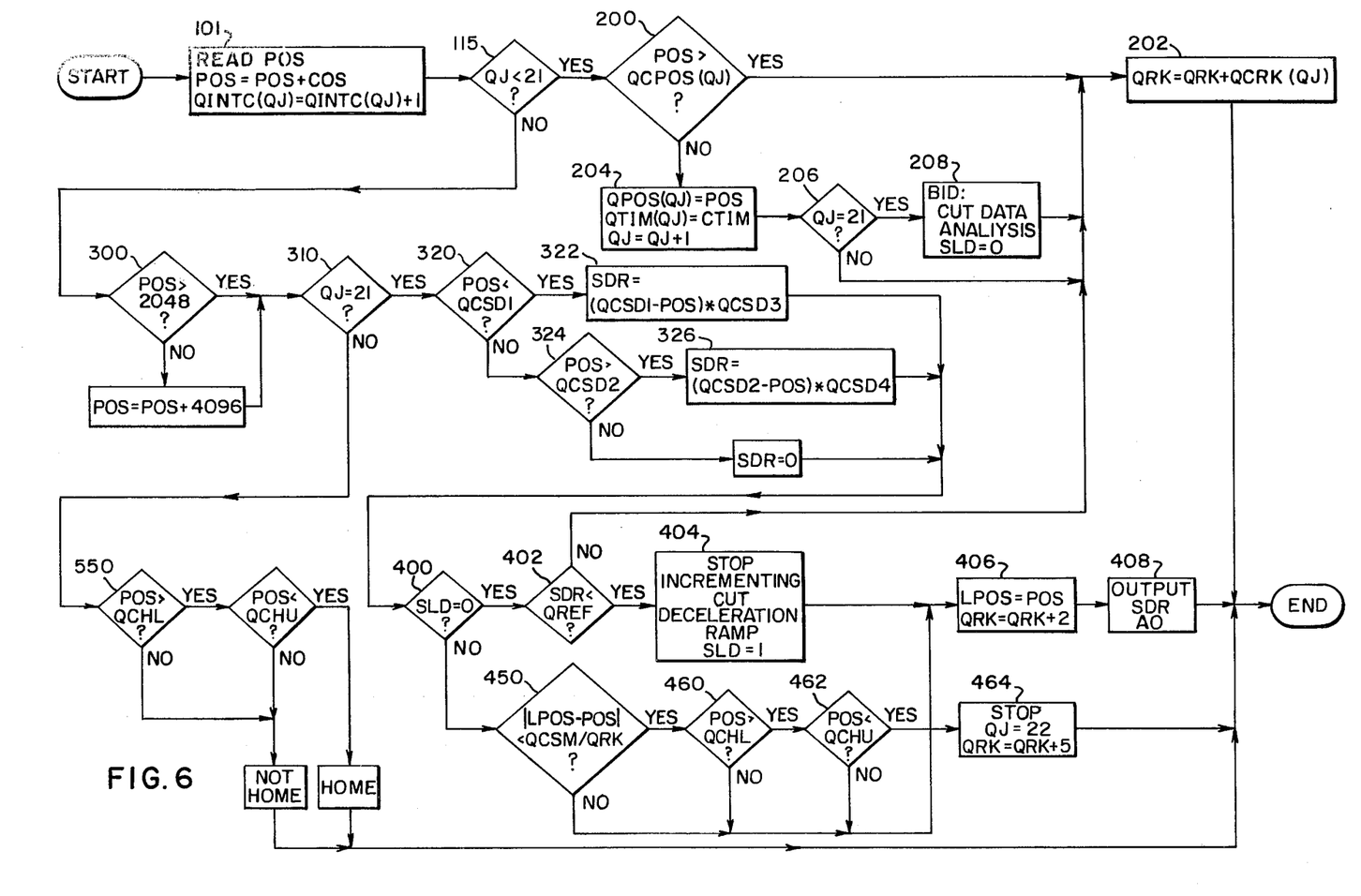
In FIG. 6 there is provided a program flow chart to illustrate the shear position monitor operation and the home position determination.

In FIG. 6 there is shown a program flow chart to illustrate the operation of the shear position monitor and home position determination program 84. During each cut cycle, this program 84 monitors the shear position as the shear accelerates to the cut. This information is used in the cut data analysis program 86 shown in FIG. 4 to establish the actual knife speed and the time at cut. As the shear decelerates, this program 84 generates a slowdown speed reference and stops the shear at the home position.

The following data is stored by the program 84:
QPOS (1 → 21) Positions chosen by the program.
QINTC (1 → 21) Number of interrupts before finding each of the positions.
QTIM (1 → 21) 10KC Clock time when each of the positions is chosen.

Among other things, the cut data analysis program 86 determines the average speed as the shear moves from one position to another position with the equation:

$$\text{Ave Speed} = \frac{QPOS(N) - QPOS(N-1)}{QINTC(N) * QCRK(N)} \qquad (14)$$

A step 101 shown in FIG. 6, each time the update counter reaches the value set in the comparator card, an interrupt bids the program. The shear position POS is read and a calibration of offset COS is added to cause the start, cut and home positions of the shear to correspond to respective readings of 0, 2048, and 4096. The interrupt counter is incremented. At step 115 a check is made to see if QJ is less than 21, and if so a check is made at step 220 to see if the index position has been reached. If its has not been reached, at step 202 the comparator RK card is set for another count. If it has been reached, at step 204 the actual position and the 10KC clock time are stored, and the table index QJ is incremented. At step 206 is QJ is then equal to 21, the cut position has just been passed to the cut data analysis program 86 is bid at step 208. The slowdown flag SLD is set to zero and the comparator RK card is set to the next value at step 202.

When the check at step 115 finds the index QJ to be equal to or greater than 21, a check is made at step 300 to see if the home position has been passed. If it has, the position is increased at step 302 by 4096 to give a position reading that continues to increase past home, if an overshooting situation is experienced. If the check at 310 finds QJ equal to 21, the shear has not reached home. Steps 320 and 322 generate a slowdown ramp as a function of position with a slope QCSD3 and a zero intercept at QCSD1. If the shear drive motor overshoots as determined at step 324, a reverse ramp with slope QCSD4 and a zero intercept at QCSD2 is generated at step 326. If the check at step 400 finds the slowdown flag is still zero, the slowdown ramp value SDR is compared at step 402 with the reference QREF from the shear speed reference output program. If the slowdown ramp value SDR is less at step 402, the shear speed reference output program is stopped, the slowdown flag is set to 1 at step 404, the position is stored at step 406 for later use in checking for low speed, and the slowdown ramp value is fed at step 408 to the analog output.

Each time the program is bid after the slowdown ramp has been utilized, if a low speed operation is detected at step 450, a test for home position is performed at step 460. If home has been achieved at step 462, the shear is stopped, the index is set to 22 at step 464 and the RK card is set for a 22 ms delay. After this last countdown, a check is made at step 550 to make sure the home position is still maintained.

The flow chart steps 101 to 208 perform the position monitoring by finding the discrete positions of the shear and recording the time of those positions. At step 200 a check is made to see if the position is still less than the next position being looked for, such as starting at zero and looking for position 100, since a ten inch movement would be 100 increments. When the ten inch movement is found, it is stored with its time, and then program begins to look for another position such as 20 inches and this is repeated until the cut position. Then the cut data analysis program begins to function at step 208. The remainder of the program shown in FIG. 6 returns the shear to the home position. When the index check at step 115 is greater than 21, the program goes to step 300 and a determination if the shear has gone past the home position, and if it has at step 302 the fixed position is increased by 4096. The positioning feedback normally starts at zero and goes to 4096 and then starts over again at zero, but for the home positioning slowdown operation when the position was less than 2048 this indicates the shear has gone past the home position. The cut position is 2048 and the home position is 4906, so if the position is less than 2048 the shear has passed the home position. In order to give a continual reading past the home position, 4096 is added. At step 310 a check is made to see if the index QJ is still 21, and if it is the shear has not reached home position. Steps 320 and 322 generate a slowdown ramp as a function of position with a slope QCSD3 and an intercept QCSD1. At step 400, if the slowdown flag SLD equals zero, the program has not found the position at which the slowdown ramp brings the shear to home position. The program keeps looking to determine when the slowdown ramp is less than the speed reference provided by the shear reference program. When this occurs, the time ramp is turned off and the slowdown ramp is followed as a function of position.

Figure 7A:
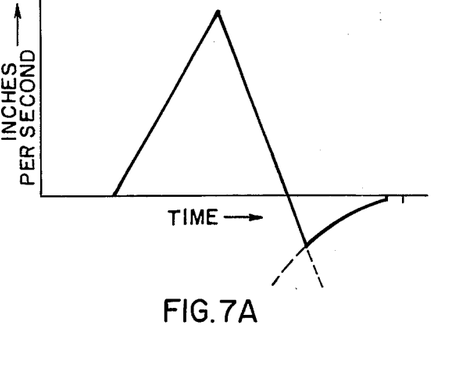
In FIG. 7A there is illustrated the controlled return of the shear to the home position after a one step acceleration cut of a workpiece.

In FIG. 7A there is illustrated the here provided return of the shear to home position after a high workpiece speed and one step acceleration cut.

Figure 7B:
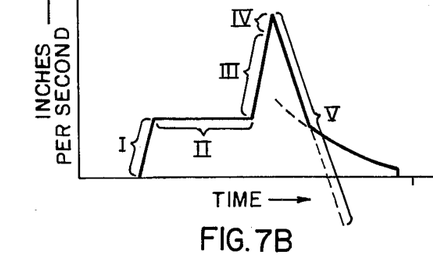
In FIG. 7B there is illustrated the controlled return of the shear to the home position after a two step acceleration cut of a workpiece.

In FIG. 7B there is illustrated the here provided return of the shear to home position after a low workpiece speed and two step acceleration cut.

Figure 8:
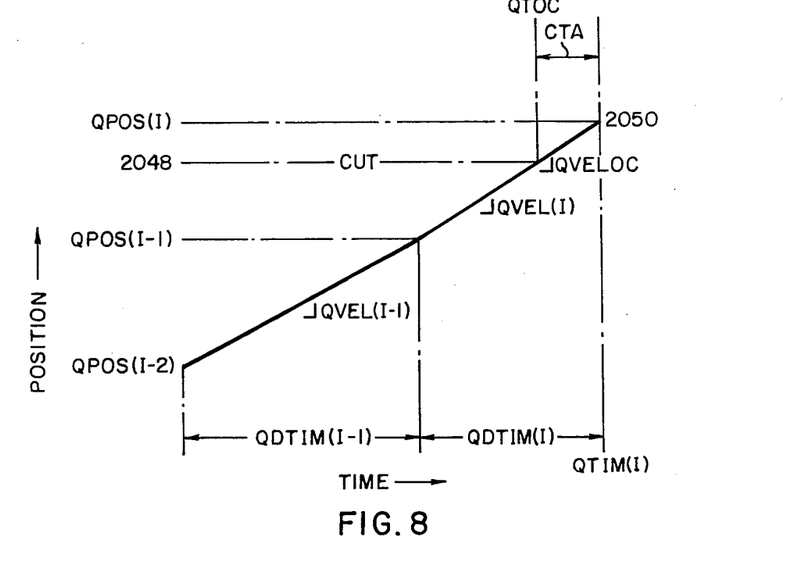
In FIG. 8 there is illustrated graphically the operation of the cut data analysis program.

In FIG. 8 there is illustrated the operation of the cut data analysis program. The quantity QDTIM is shown as the difference in time in milliseconds from position reading QPOS(I-2) to position reading QPOS(I-1) and to position reading QPOS(I). The velocity QVEL in feet per minute during travel from one position reading to the next position reading is shown. QTOC is the 10KC clock time of the workpiece cut, and QVELOC is the velocity in FPM at the workpiece cut.

The shear position monitor program, during each cut cycle, collects time and position data as the shear accelerates from standstill to workpiece cut, and looks for shear positions at 100 increment steps starting with values of 148, 248, 348 and so forth up to 1948 and the 2048 cut position. As soon as the position just after cut is detected, it bids the shear cut data analysis program.

The shear cut data analysis program analyzes the data collected by the position monitor program to establish the precise time of cut and the velocity of the knife at time of cut, which information is used to improve the accuracy of cutting and the accuracy of shear speed for the next similar cut of a workpiece. The velocity between each set of positions is calculated and printed on a display so the speed of the shear during acceleration can be studied.

Figure 9:
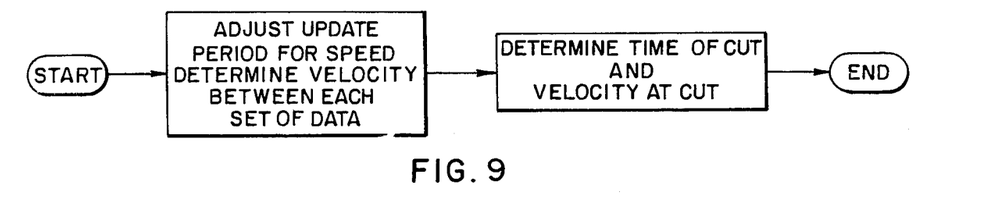
In FIG. 9 there is provided a flow chart to illustrate the cut data analysis operation; and In FIG. 10 there is provided a flow chart to illustrate the operation of the shear speed reference output program.

In FIG. 9 there is provided a flow chart for the shear cut data analysis program. The positions QPOS(I) and the times QDTIM(I) between positions are converted into velocities. The time difference is the product of the number of RK interrupts QINTC(I), the sampling period for the period QCRK(I) and the update frequency 220 per second. The conversion constant for velocity QCVC is also derived. The sampling period is stored in block data for each of 20 position. At step 600 the update period is adjusted for speed. At standstill the position detector update period is 1/220 second or 4.5454 millisecond. As the shear moves, the period changes in proportion to the fraction of a revolution moved during one update period. At 4000 FPM, the encoder moves about 7.2 increments per millisecond and 32.8 increments in a 4.54 millisecond update period; the portion of a revolution during the update period is 32.8 ÷ 4096 or 0.008 so the update period is adjusted by 0.8% because of this speed. The velocity QVEL(I) is calculated for each set of positions. After the 19 values are calculated, the time and velocity at cut are determined at step 602 by linear interpolation for the time and by extrapolation for the velocity. The velocity is determined by the relationship $$VEL\ INC/M\ SEC * \frac{455.48\ in}{4096\ inc} * \frac{60000\ M\ SEC}{Minute} \quad (15)$$
$$* \frac{1\ FT}{12\ IN} = VEL\ FPM$$
$$VEL\ INC/M\ SEC * 556.006 \frac{FPM\ MSEC}{INC} = VEL\ FPM \quad (16)$$

Typically the data is not obtained right at workpiece cut as desired but a little past cut, so by interpolation between the next to the last position and the position just after cut, the time of the cut and the velocity at cut can be established. If the actual time of cut is not the same as the expected time of cut, the difference error is put into the learning table and the same is done in relation to velocity. After a few workpiece cuts, the intermediate speed and the distance SP can be established and are assumed to be repeatable; therefore the adaptive learning is limited to the velocity at cut and the time of cut for controlling the desired workpiece cut accuracy for the various workpiece speeds. The shear operator is interested in having a reasonable acceleration rate, but the velocity at cut and the time of cut are the most important parameters to be controlled.

Figure 10:
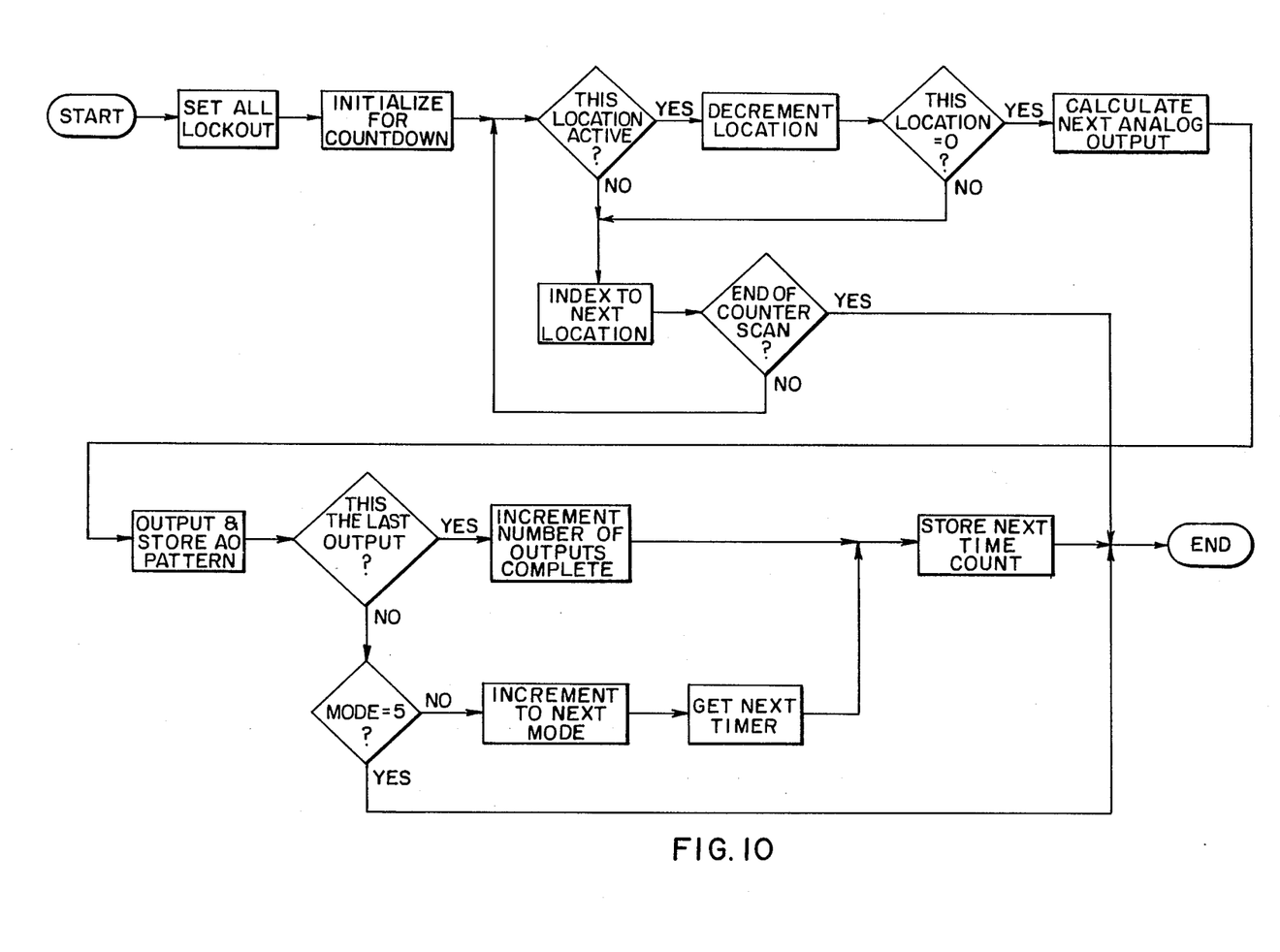

In FIG. 10 there is provided a flow chart for the shear speed reference output program 82. This program is an out of sequence program executed (under hardware lockout) once each generation of the 1 KC interrupt clock. It scans a table containing the time countdowns looking for an active timer. These timers initiate the ramping of the shear speed reference and generate the incremental changes in the speed reference to ramp the speed up or down. Active-timers are defined as positive values. If a location is zero no action is taken. If a timer is active the location is decremented and a check for zero is made. If the location is now zero the timer has elapsed and a subprogram is executed. The shear ramp generator subprogram outputs the pattern specified by the shear reference calculation. Up to five ramp segments are provided, as shown in FIG. 7B in reference to segments I, II, III, IV and V. The following calculation is made to determine the analog output.

$$\text{Output} = (\text{Initial Output}) + \left[ \frac{(\text{increments per } \Delta t) * (\text{number of outputs complete})}{8} \right] \quad (17)$$

The increments per $\Delta t$ would normally tend to be other than a whole number so, to improve the accuracy of the ramping, the shear reference program multiplies the value by 8. After the multiplication by number of outputs is completed, the result is divided by 8 to give a desired value. After the output is made, the analog output is stored in core and the 1 KC countdown timer is restored. This sequence continues until the number of outputs performed equals the number of desired outputs, at which time the next segment is selected. If the current segment is 5 then the program terminates and the 1 KC countdown timer is not restored.

GENERAL DESCRIPTION OF INSTRUCTION PROGRAM LISTING

There is included an instruction program listing that has been prepared to control the operation of a shear drive motor in accordance with the present control system and method as disclosed in FIG. 4. The instruction program listing is written in the machine language and Fortran of the P2500 digital computer system, which is sold by Westinghouse Electric Corporation for real time process control computer applications. Many of these digital computer systems have already been supplied to customers, including customer instruction books and descriptive documentation to explain to persons skilled in this art the operation of the hardware logic and the executive software of this digital computer system. This instruction program listing is included to provide an illustration of one suitable embodiment of the present control system and method that has actually been prepared. This instruction program listing at the present time has been partially debugged through the course of limited practical operation for the real time control of a shear drive motor, but it is understood and well known by persons skilled in this art that most real time process control application programs contain some bugs or minor errors, and it is within the routine skill of such persons and takes varying periods of actual operation time to identify and correct the more important of these bugs.

I claim as my invention:

1. In apparatus for providing a desired cut of a moving workpiece by a shear device driven by a motor, the combination of:
   means for determining the movement of speed of the workpiece;
   means responsive to said speed for determining an operational parameter of the shear device at the time of the workpiece cut; and
   means for controlling said shear device by one of first and second predetermined speed characteristics in accordance with said determined operational parameter.

2. The apparatus of claim 1, with said first predetermined speed characteristic being for workpiece speeds below a selected workpiece speed and with said second speed characteristic being for workpiece speeds above said selected workpiece speed.

3. The apparatus of claim 1, with said determined operational parameter being the acceleration rate of the shear device.

4. The apparatus of claim 1, with said determined operational parameter being the armature current of said motor.

5. The apparatus of claim 1, including
   means responsive to said movement speed for determining a predicted speed of the shear device for making said cut of the workpiece,
   means operative with said shear device for determining the actual speed of the shear device when the cut of said workpiece is made, and
   means for comparing said predicted speed and said actual speed of the shear device for providing a speed correction in relation to providing a cut of a subsequent workpiece.

6. The apparatus of claim 1, including
   means responsive to said movement speed for determining a predicted time of said cut of the workpiece,
   means responsive to the operation of said shear device for determining the actual time of said cut of the workpiece, and
   means for comparing said predicted time and said actual time for determining a time correction in relation to providing a desired cut of the next workpiece similar to said moving workpiece.

7. In a method of providing a desired cut of a moving workpiece by a shear driven by a motor, the steps of:
   establishing the movement speed of the workpiece;
   establishing in response to said speed a selected operational parameter of said shear device at the time of the workpiece cut; and
   controlling said shear device in accordance with one of first and second speed characteristics determined by said operational parameter.

8. The method of claim 7 with said selected operational parameter being the acceleration rate of said shear device.

9. The method of claim 7, with said selected operational parameter being the armature current of the motor driving said shear device.

10. The method of claim 7, with said first speed characteristic being for workpiece speeds below a chosen workpiece speed and with said second speed characteristic being for workpiece speeds above said chosen workpiece speed.

11. The method of claim 7, including the steps of
establishing in response to said movement speed of the workpiece a predicted shear device speed for said cut of the workpiece; and
establishing the actual speed of said cut for comparison with said predicted shear device speed to determine a speed correction in relation to providing a cut of a subsequent workpiece.

12. The method of claim 7, including the steps of
establishing in response to said movement speed a predicted time of said cut of the workpiece; and
establishing the actual time of said cut of the workpiece for comparison with said predicted time to provide a time correction in relation to the next similar cut of a workpiece.

13. The method of claim 7, including the steps of
establishing in response to said movement speed at least one of a predicted shear device speed and a predicted time for said cut of a workpiece; and
establishing a predetermined correction in relation to providing a cut of a subsequent workpiece in accordance with at least one of said predicted shear device speed and said predicted time for said cut of a workpiece.

14. In apparatus for providing a desired cut of a moving workpiece by a shear device, the combination of:
means for determining the movement speed of the workpiece in relation to said shear device;
means responsive to said movement speed for determining a first speed characteristic in accordance with a first range of workpiece movement speeds and a second speed characteristic in accordance with a second range of workpiece movement speeds; and
means for controlling said shear device in response to one of said first and second speed characteristics to effect said desired cut of the workpiece.

15. The apparatus of claim 14, including means operative with said controlling means for determining the time of the cut of said workpiece.

16. The apparatus of claim 14, including:
means responsive to the position of said shear device; and
means operative with said position responsive means for determining the time of the cut of the workpiece by said shear device.

17. The apparatus of claim 14, with at least one of said first and second speed characteristics having a plurality of acceleration steps.

18. The apparatus of claim 14, with said first speed characteristic having a single acceleration step and with said second speed characteristic having a plurality of acceleration steps.

19. In a method of providing a desired cut of a moving workpiece by a shear device driven by a motor, the steps comprising:
establishing the movement speed of the workpiece;
predicting in response to said movement speed a predetermined operation of said shear device at the time of the workpiece cut;
establishing a speed characteristic for said motor having one of at least a single acceleration step or a plurality of acceleration steps in accordance with said predicted operation of said shear device; and
controlling said motor driving the shear device in accordance with said speed characteristics to effect said desired cut of the workpiece.

20. The method of claim 19, with said step of establishing a speed characteristic providing one speed characteristic when the movement speed is within one range of workpiece movement speeds and providing another speed characteristic when the movement speed is within a different range of workpiece movement speeds.

21. The method of claim 20, with said one range of workpiece movement speeds being below a selected workpiece speed.

22. The method of claim 19, with said speed characteristic having a single acceleration step when said workpiece movement speed is above a predetermined value.

23. The method of claim 19, including the step of:
determining the time of the cut of said workpiece in accordance with the control of said motor.

24. The method of claim 19, with said speed characteristic having said plurality of acceleration steps below a selected workpiece speed.

* * * * *